(12) United States Patent
Wei

(10) Patent No.: US 9,602,269 B2
(45) Date of Patent: Mar. 21, 2017

(54) DYNAMIC TIME DIVISION DUPLEXING METHOD AND APPARATUSES USING THE SAME

(71) Applicant: Acer Incorporated, New Taipei (TW)

(72) Inventor: Hung-Yu Wei, New Taipei (TW)

(73) Assignee: Acer Incorporated, New Taipei (TW)

( * ) Notice: Subject to any disclaimer, the term of this patent is extended or adjusted under 35 U.S.C. 154(b) by 220 days.

(21) Appl. No.: 14/151,839

(22) Filed: Jan. 10, 2014

(65) Prior Publication Data

US 2014/0334353 A1    Nov. 13, 2014

Related U.S. Application Data

(60) Provisional application No. 61/822,884, filed on May 13, 2013.

(51) Int. Cl.
| | |
|---|---|
| *H04J 3/00* | (2006.01) |
| *H04L 5/14* | (2006.01) |
| *H04L 5/00* | (2006.01) |
| *H04W 72/12* | (2009.01) |

(52) U.S. Cl.
CPC .......... *H04L 5/1469* (2013.01); *H04L 5/0096* (2013.01); *H04W 72/1263* (2013.01)

(58) Field of Classification Search
CPC . H04L 5/1469; H04L 5/0096; H04W 72/1263
See application file for complete search history.

(56) References Cited

U.S. PATENT DOCUMENTS

| | | | |
|---|---|---|---|
| 2010/0067496 A1* | 3/2010 | Choi | H04W 52/54 370/336 |
| 2012/0220329 A1* | 8/2012 | Kitazoe | H04W 48/12 455/515 |
| 2013/0016841 A1* | 1/2013 | Fong | H04L 5/001 380/287 |
| 2013/0044651 A1* | 2/2013 | Wang | H04W 72/0406 370/280 |

(Continued)

FOREIGN PATENT DOCUMENTS

WO    2013042991    3/2013

*Primary Examiner* — Gregory Sefcheck
*Assistant Examiner* — Jael Ulysse
(74) *Attorney, Agent, or Firm* — Jianq Chyun IP Office

(57) ABSTRACT

The present disclosure proposes a dynamic time division duplexing (TDD) method applicable to a user equipment and a control node, and apparatuses using the same method. Accordingly, the present disclosure proposes a base station (BS) which transmits to a least one user equipment (UE) a system information block (SIB) having a first modification period, and the base station may transmit a TDD uplink-downlink subframe configuration during the first modification period. The BS also configures for at least one UE a second modification period which is in an integer divisor of the first modification period and could be within the first modification period so that the BS may transmit a second TDD uplink-downlink subframe configuration in the second modification period. As the second modification period is shorter than the first modification period and is periodically scheduled, the BS may alter the current TDD uplink-downlink subframe configuration dynamically at a faster rate.

22 Claims, 17 Drawing Sheets

(56) References Cited

U.S. PATENT DOCUMENTS

| | | | | |
|---|---|---|---|---|
| 2013/0044652 A1* | 2/2013 | Wang | ............... | H04L 1/08 |
| | | | | 370/280 |
| 2013/0083704 A1* | 4/2013 | Gaal | ............... | H04L 5/001 |
| | | | | 370/277 |
| 2013/0188516 A1* | 7/2013 | He | ............... | H04W 28/16 |
| | | | | 370/254 |
| 2013/0188533 A1* | 7/2013 | He | ............... | H04J 3/1605 |
| | | | | 370/280 |
| 2013/0294268 A1* | 11/2013 | Xu | ............... | H04W 72/082 |
| | | | | 370/252 |
| 2013/0301492 A1* | 11/2013 | Ji | ............... | H04W 72/042 |
| | | | | 370/280 |
| 2014/0036719 A1* | 2/2014 | Li | ............... | H04W 74/006 |
| | | | | 370/254 |
| 2014/0119261 A1* | 5/2014 | Wang | ............... | H04W 72/04 |
| | | | | 370/312 |
| 2014/0177485 A1* | 6/2014 | Wang | ............... | H04L 1/00 |
| | | | | 370/280 |
| 2014/0293844 A1* | 10/2014 | Meng | ............... | H04L 5/1438 |
| | | | | 370/280 |

* cited by examiner

| Uplink-Downlink Configuration | Subframe number | | | | | | | | | | Uplink:Downlink Ratio |
|---|---|---|---|---|---|---|---|---|---|---|---|
| | 0 | 1 | 2 | 3 | 4 | 5 | 6 | 7 | 8 | 9 | |
| 0 | D | S | U | U | U | D | S | U | U | U | 2:6 |
| 1 | D | S | U | U | D | D | S | U | U | D | 4:4 |
| 2 | D | S | U | D | D | D | S | U | D | D | 6:2 |
| 3 | D | S | U | U | U | D | D | D | D | D | 6:3 |
| 4 | D | S | U | U | D | D | D | D | D | D | 7:2 |
| 5 | D | S | U | D | D | D | D | D | D | D | 8:1 |
| 6 | D | S | U | U | U | D | S | U | U | D | 3:5 |

FIG. 1 (RELATED ART)

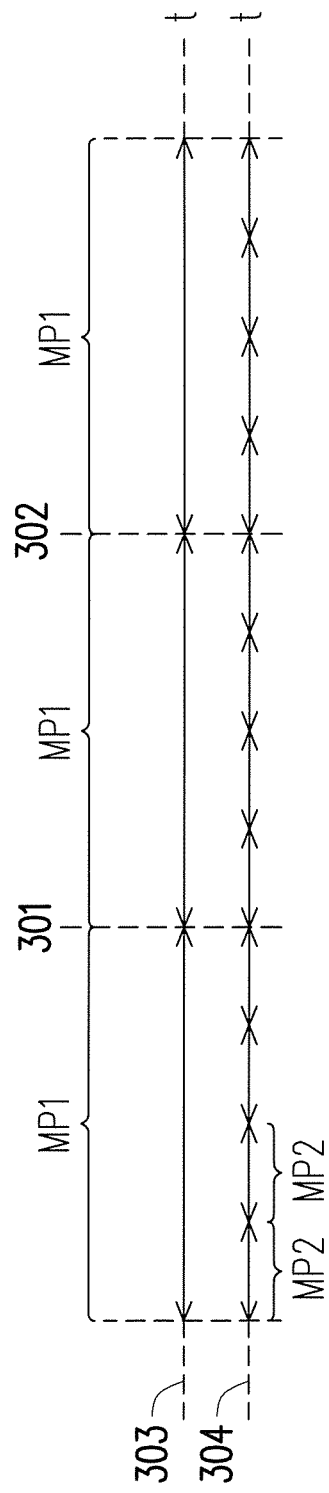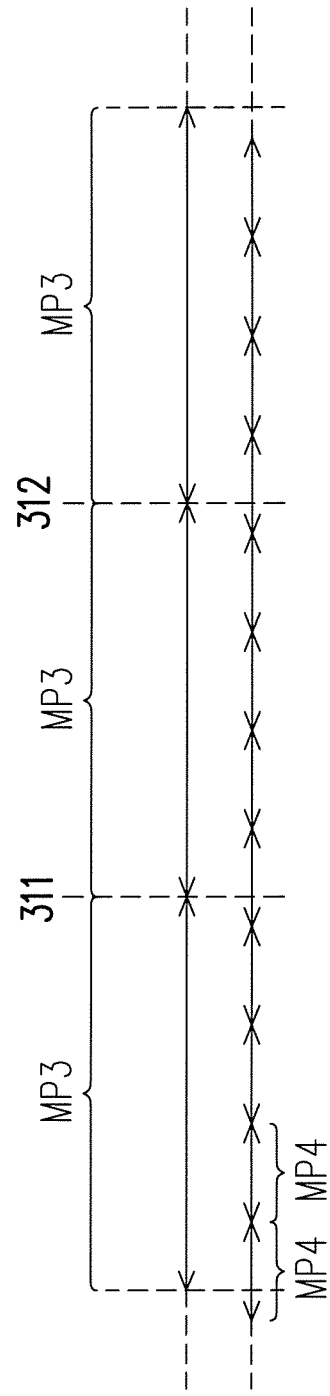

DYNAMIC TIME DIVISION DUPLEXING METHOD AND APPARATUSES USING THE SAME

CROSS REFERENCE TO RELATED APPLICATION

This application claims the priority benefit of U.S. provisional application Ser. No. 61/822,884, filed on May 13, 2013. The entirety of the above-mentioned patent application is hereby incorporated by reference herein and made a part of specification.

TECHNICAL FIELD

The present disclosure directs to a method related to a dynamic time division duplexing (TDD) mechanism applicable to a user equipment and a control node, and apparatuses using the same method.

RELATED ART

A TDD system typically refers to a communication system in which uplink and downlink transmissions would share a single carrier frequency but be divided in the time domain across different subframes. In a typical Long Term Evolution (LTE) communication system, a radio frame would be divided into 10 subframes, and each subframe could be allocated for an uplink transmission, a downlink transmission, or a special subframe which is used as a guard period and/or as a time slot reserved for a pilot signal. Such allocation schemes for each individual subframes could be defined according to several possible configurations. FIG. 1 is a chart which illustrates a conventional LTE TDD uplink-downlink frame configurations with a D denoting a downlink subframe, a U denoting a uplink subframe, or a S denoting a special subframe for each of the subframes numbered from 0 to 9. For example, if the uplink-downlink frame configuration zero is selected, then subframe numbers 0 and 5 would be allocated for downlink transmissions, subframe numbers 1 and 6 would be allocated as special subframes, and the rest of the subframes, subframe numbers 2~4 and 7~9, would be allocated for uplink transmissions. The uplink to downlink ratio for configuration 0 would be 2 versus 6.

The configurations of these downlink subframes and uplink subframes has conventionally been quite static during system operations since a network operator would select the configuration based on the long-term average of uplink and downlink traffic ratios. However, it has been observed recently that wireless data traffic has coming bursty in nature, and the variation of downlink-uplink traffic ratio could be at times very dynamic. Also with the advent of the Machine Type Communication (MTC), an enormous number of user equipments may attempt to attach to a network at once. Consequently, a dynamic TDD system in which uplink and downlink subframe ratios could be adaptively configured according to the traffic variation has been considered in order to improve the performance of a communication system as "Further Enhancements to LTE TDD for DL-UL Interference Management and Traffic Adaptation" has been considered to be an important working item for 3GPP Release 12.

However, dynamic alteration of the uplink-downlink frame configuration would not be without difficulties. Usually, the uplink-downlink frame configuration would be selected based on a per cell basis, and a cell would be configured with the same downlink/uplink configuration with other cells nearby in order to avoid interferences among cells. In order to accommodate various traffic patterns, a group of cells could be configured with the same uplink-downlink frame configuration although inter-cell interference would need to be carefully monitored. Therefore, for the purpose of avoiding interfaces among cells, it would not be easy to alter the uplink-downlink frame configuration dynamically.

Also after a uplink-downlink frame configuration has been selected, the configuration would be written as a part of the system information (SI) which is written in System Information Blocks (SIB) and be broadcasted to user equipments (UEs) under the coverage of a base station in a periodic fashion. FIG. 2 illustrates a conventional TDD uplink-downlink frame configurations updating mechanism in accordance with a current LTE communication system. The system information in general could be changed by a base station during the boundary of a modification period. When a base station decides to change the system information, the UEs under the coverage of the base station may be notified by paging, which may be done throughout a modification period. In the following modification period, the base station may transmit the SIBs with updated system information. An UE normally would not acquire SIBs unless a paging message containing an indicator to modify system information is received by the UE.

However, the traditional SIB update mechanism is not yet satisfactory for the purpose of dynamically updating a system parameter such as the uplink-downlink frame configuration in a real time basis. The system information could be broadcasted, for example, every 320 milliseconds. The broadcast periodicity is kept relatively short in order to accommodate UEs which may frequently move in and out of the broadcast range without having to wait for a long period to acquire system information.

One problem is that a base station cannot make alterations to system information during every broadcast as it would mean that the UEs have to check whether the system information is altered more frequently than necessary. Instead, a base station may only modify system information at the front boundary of a modification period (MP), which may occur, for example, every 40 seconds. As the result of the long modification period, it would be rather difficult for a base station to instantaneously change the uplink-downlink frame configuration in case the traffic becomes heavy all in a sudden. For the exemplary scenario of FIG. 2, when SI needs to be changed within MP 201, the UEs would be notified of the change by paging messages. The changed SI will not be in effect until at the border 202 of the next modification period 203.

A base station may want to switch the uplink-downlink frame configuration at the instant when the traffic pattern has suddenly shifted within MP 201; however, the base station must wait until the following MP boundary 202 in order to change the system information, and thus having a long MP might cause difficulties for base stations to adjust to quickly adjust to the variation of traffic patterns since a base station may want to adjust the uplink-downlink frame configuration more frequently than the long MP allows.

Therefore, a new dynamic time division duplexing (TDD) mechanism could be used for a base station or a network control node to dynamically adjust the uplink-downlink frame configuration of the wireless communication system. The new TDD mechanism also would still be required to be backward compatible with legacy UEs using the conventional TDD signaling mechanism since it would unrealistic for all UE to quickly adhere to any new proposed standard.

SUMMARY OF THE DISCLOSURE

The present disclosure directs to a dynamic time division duplexing (TDD) method applicable to a user equipment and a control node, and apparatuses using the same method.

In particular, the present disclosure directs to a dynamic time division duplexing (TDD) method which is applicable to a user equipment, and the method includes receiving a first system information block which has a first modification period, receiving a first TDD uplink-downlink frame configuration within the first modification period, receiving a configuration for a second modification period which is an integer divisor of the first modification period with the integer being greater than zero, receiving a second TDD uplink-downlink frame configuration within the second modification period which is within the first modification period, and transmitting or receiving data according to the first TDD uplink-downlink frame configuration and the second TDD uplink-downlink frame configuration.

It should be noted that The first system information could be the system information block type 1 (SIB1) which is transmitted a part of the broadcasted system information (SI). The SIB1 could only be updated as soon as the boundary of the next modification period and thus would not change dynamically. However, since the second modification period is an integer divisor of the current (first) modification period with the integer being greater than one, the TDD uplink-downlink frame configuration based on the proposed method could be changed at least twice within the first modification period.

In one of the exemplary embodiments, the first modification period is substantially time aligned in both the beginning and in the end of the first modification period with an integer multiple of the second modification period. The integer would be greater than one.

In one of the exemplary embodiments, the UE does not change the second TDD uplink-downlink frame configuration during at least one second modification period of the first modification period. In other words, the UE has a 'no-change zone' within which the TDD uplink-downlink frame configuration would not be changed. The 'no-change' zone could have a length of at least one second modification period or longer. The 'no-change' zone could be periodic or could be a one time occurrence. The 'no-change' zone could be at the beginning or at the end of the first modification period.

In one of the exemplary embodiments, a UE would receive the configuration for the second modification period in a second system information block, and the second modification period conveyed by the second system information block could be received at a faster rate than the first system information block.

In one of the exemplary embodiments, the second system information block would include a first indicator indicating the existence of the second TDD uplink-downlink configuration.

In one of the exemplary embodiments, the second system information block would further include a second indicator indicating whether the second TDD uplink-downlink configuration has been changed.

In one of the exemplary embodiments, when the UE receives the second TDD uplink-downlink frame configuration, the UE would transmit or receive data according the second TDD uplink-downlink frame configuration after a predetermined period.

In one of the exemplary embodiments, when the UE is in a RRC connected mode, the UE could receive the configuration for the second modification period through one of a physical layer signaling message, a media access control (MAC) layer signaling message, a multimedia broadcast multicast service (MBMS) message, and a radio resource control (RRC) signaling message.

In one of the exemplary embodiments, when the UE is a RRC idle mode, the UE could receive the configuration for the second modification period by receiving a paging message, receiving the second system information block according to the paging message, and receiving the configuration for the second modification period from the second system information block.

In one of the exemplary embodiments, the UE would include at least but not limited to a transmitter and a receiver for transmitting and receiving wireless data respectively, and a processor electrically coupled to the transmitter and the receiver and is configured to execute the aforementioned functions.

The present disclosure is also directed to a dynamic time division duplexing (TDD) method which is applicable for a control node, and the method would include the steps of transmitting a system information block which has a first modification period, transmitting a first TDD uplink-downlink frame configuration during the first modification period, transmitting a configuration for a second modification period which is semi-persistently scheduled and is an integer divisor of the first modification period with the integer being greater than zero, transmitting a second TDD uplink-downlink frame configuration during the second modification period which is within the first modification period, and transmitting or receiving according to the first TDD uplink-downlink frame configuration and transmitting or receiving according to the second TDD uplink-downlink frame configuration.

It should be noted that for the control node, the first system information could be the system information block type 1 (SIB1) which is transmitted a part of the broadcasted system information (SI). The SIB1 could only be updated as soon as the boundary of the next modification period and thus would not change dynamically. However, since the second modification period is an integer divisor of the current (first) modification period with the integer being greater than one, the TDD uplink-downlink frame configuration based on the proposed method could be changed at least twice within the first modification period.

In one of the exemplary embodiments, for the control node, the integer division of the first modification period is substantially time aligned with the second modification period.

In one of the exemplary embodiments, the control node does not change the second TDD uplink-downlink frame configuration during at least one second modification period of the first modification period. In other words, the control node imposes a 'no-change zone' within which the TDD uplink-downlink frame configuration would not be changed. The 'no-change' zone could have a length of at least one second modification period or longer. The 'no-change' zone could be periodic or could be an one time occurrence. The 'no-change' zone could be at the beginning or at the end of the first modification period.

In one of the exemplary embodiments, the control node configures the second modification period by transmitting a second system information block which comprises the configuration for the second modification period. The second system information block would be transmitted in a faster rate than the first system information block.

In one of the exemplary embodiments, the second system information block transmitted by the control node would include a first indicator indicating the existence of the second TDD uplink-downlink configuration.

In one of the exemplary embodiments, the second system information block transmitted by the control node would include a second indicator indicating whether the second TDD uplink-downlink configuration has been changed.

In one of the exemplary embodiments, when the control node transmits the second TDD uplink-downlink frame configuration, the control node would transmit or receive data according the second TDD uplink-downlink frame configuration after a predetermined period.

In one of the exemplary embodiments, assuming that a target UE is a RRC active mode, the control node would transmit the configuration for the enhanced modification period through one of a physical layer signaling message, a media access control (MAC) layer signaling message, a multimedia broadcast multicast service (MBMS) message, and a radio resource control (RRC) signaling message.

In one of the exemplary embodiments, assuming that a target UE is a RRC idle mode, the control could transmit the second system information block indicated by sending a paging message, transmitting the second system information block indicated by the paging message, and transmitting the configuration for the second modification period using the second system information block.

In one of the exemplary embodiments, the control node would include at least but not limited to a transmitter and a receiver for transmitting and receiving wireless data respectively, and a processor electrically coupled to the transmitter and the receiver and is configured to execute the functions as aforementioned to describe the control node.

In one of the exemplary embodiments, the control node would be one of a base station (BS), an evolved node B (eNB), a node B, a small cell BS, a Self Organizing Network (SON) server, a mobility management entity (MME), a network controller, a core network gateway, and a radio network controller.

In one of the exemplary embodiments, information related to the second modification period could be transmitted across an inter-base station interface such as a X2 interface or is transmitted across a back-haul link such as S1 interface.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1 illustrates a set of predefined TDD uplink-downlink frame configurations in accordance with a current LTE communication system.

FIGS. 3A & 3B illustrate a conventional modification period co-exist with a fast modification period across the time domain in accordance with two of the exemplary embodiments of the present disclosure.

DETAILED DESCRIPTION OF DISCLOSED EMBODIMENTS

Figure 2:
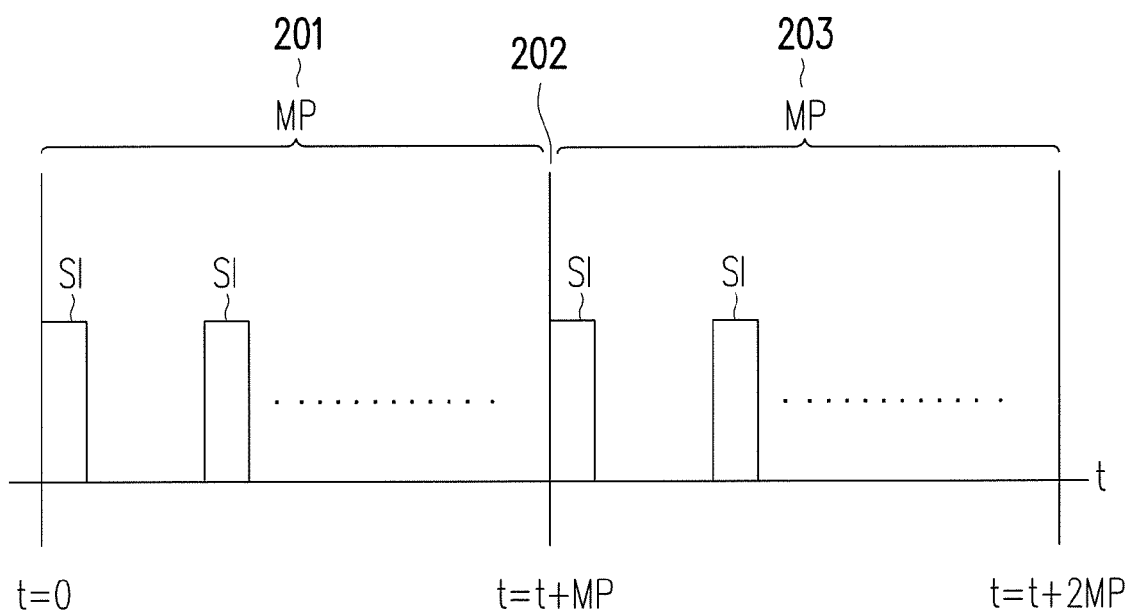
FIG. 2 illustrates a conventional TDD uplink-downlink frame configurations updating mechanism in accordance with a current LTE communication system.

Reference will now be made in detail to the present preferred embodiments of the disclosure, examples of which are illustrated in the accompanying drawings. Wherever possible, the same reference numbers are used in the drawings and the description to refer to the same or like parts.

In order to dynamically adjust TDD uplink-downlink subframe configurations, design considerations would not only involve reducing the overall lead time to enact a new TDD uplink-downlink subframe configurations but also the resulting inter-cell interferences would need to be effectively curtailed. Also, backward compatibility and co-existence with legacy devices would also need to be taken into consideration. Therefore, the present disclosure proposes a faster signaling mechanism applied between base stations and UEs than the conventional mechanism. As the lead time to enact a new TDD uplink-downlink subframe configuration for legacy devices is bound by the modification period of the system information, the present disclosure proposes a method to reduce said lead time by several multiples in such a way which would potentially minimize the resulting inter-cell interferences. Additionally, information related to dynamic TDD uplink-downlink frame configurations could be exchanged among base stations and network controllers through inter-base station links and backhaul links.

FIGS. 3A & 3B are conceptual illustrations which aim to elucidate a fast modification period across the time domain in accordance with one of the exemplary embodiments of the present disclosure. The top time axis 303 of FIG. 3A illustrates modification period of a conventional signaling mechanism in which only after modification boundaries such as 301 302 would a new system information be enacted. Since the TDD uplink-downlink subframe configuration would be located in system information block type 1 (SIB1), dynamic adjustments of TDD uplink-downlink subframe configuration would be difficult as the lead time to enact a new TDD uplink-downlink subframe configuration is bound by the modification period (MP1) of the conventional system information.

Thus, the present disclosure proposes a fast TDD adaptation using a fast modification period (MP2) as illustrated on the bottom of the time axis 304 of FIG. 3A so that the switching time granularity for altering TDD uplink-downlink frame configuration would be shortened by an integer multiple. The fast TDD adaptation mechanism would co-exist with the conventional mechanism as new UEs which are aware of the fast TDD adaptation mechanism would co-exist with legacy UEs which are not aware of the fast TDD adaptation mechanism. In general, the fast modification period such as MP2 would be an integer divisor of MP1 (i.e. MP1=N*MP2) where N is a positive integer greater than 1. In the example of FIG. 3A, N would equal to 4. Therefore, in this way, information related to dynamic TDD uplink-downlink frame configuration could be delivered to UEs periodically in a more frequent manner. Furthermore, for the embodiment of FIG. 3A, the modification boundary (MP1) of the conventional signal mechanism would be almost exactly or substantially timed aligned with an integer multiple of the fast modification period (MP2) of the proposed fast TDD adaptation mechanism. Therefore, when both signaling mechanisms are used, the switch point of the TDD uplink-downlink subframe configuration for the conventional TDD signaling mechanism would overlap with the switching point under the fast TDD adaptation signaling mechanism.

Figure 4:
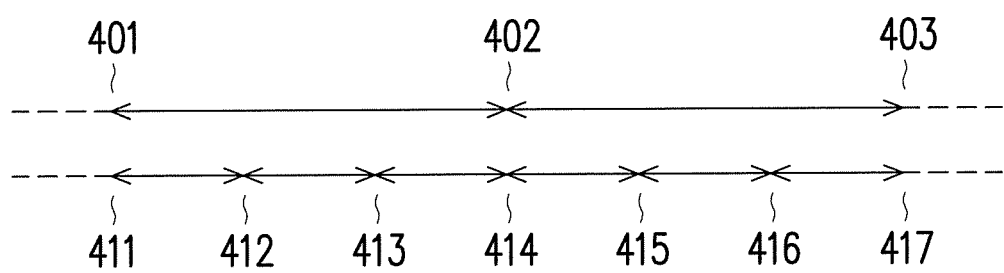
FIG. 4 illustrates switching points of TDD uplink-downlink frame configuration in the conventional modification period and the fast modification period across the time domain in accordance with one of the exemplary embodiments of the present disclosure.

FIG. 4 illustrates an exemplary embodiment based on the disclosure related to FIG. 3A. The exemplary embodiment of FIG. 4 is similar to the exemplary embodiment of FIG. 3A except that N is equal to 3 for FIG. 4 and also for both conventional signaling mechanism and the proposed fast TDD adaptation mechanism, only at the boundary between the modification periods could the TDD uplink-downlink frame configuration be changed. In this way, only at modification boundaries 401~403 for the conventional signaling mechanism and only at modification boundaries 411~417 for the fast TDD adaptation mechanism could the TDD uplink-downlink frame configuration be changed. Also notice that since N=3, modification boundaries 401, 402, and 403 would be substantially time aligned with modification boundaries 411, 414, and 417 respectively. The benefit of such time alignment is two fold. First, by limiting the degree of freedom as in FIG. 3A, the network management and configuration would easier as uncertainty would be reduced. Second, by further limiting the switching point such as in FIG. 4, the inter-cell interference would be reduced when both the legacy UEs and UEs which are aware of the fast TDD adaptation mechanism could switch the TDD uplink-downlink frame configuration at nearly the same time.

FIG. 3B is an exemplary embodiment which is slightly different from FIG. 3A in the way that an integer multiple of modification period of the proposed fast TDD adaptation mechanism is not synchronously aligned with the modification period of the conventional signaling mechanism. In other words, the legacy UEs and UEs which are aware of the fast TDD adaptation mechanism would not switch the TDD uplink-downlink frame configuration at the same time. The embodiment of FIG. 3B could be used if inter-cell interferences are tolerable and may have the benefit of requiring less network resources to make sure that the switching points are synchronously aligned. Also the concept of limiting the switching points only at the modification boundaries as shown in FIG. 4 may also apply for FIG. 3B.

Figure 5:
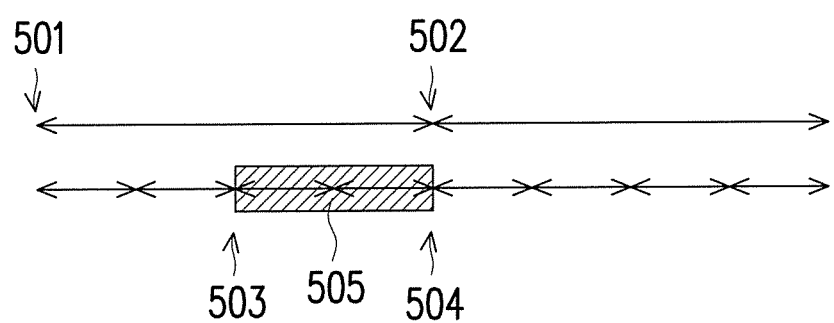
FIG. 5 illustrates impermissible fast modification period in the end of the conventional modification period in accordance with one of the exemplary embodiments of the present disclosure.

FIG. 5 is a conceptual illustration of "no fast modification period" in accordance with one of the exemplary embodiments of the present disclosure. Assuming that dual signaling mechanism is used, within a conventional modification period (MP1) such as between boundaries 501 and 502, the current TDD uplink-downlink subframe configuration would not be allowed to be switched during one or more fast modification period (MP2's) such as between boundaries 503 and 504. By restricting such dynamic changes, the signaling overhead would be reduced, the interference management would be less complex, and unnecessary TDD frame configuration change would be avoided. When a base station transmits a signaling to convey a change in the TDD uplink-downlink subframe configuration, the signaling may additionally include a time duration of the 'no fast modification period' 505. Referring to the exemplary scenario of FIG. 5, an one-time 'no fast modification period' 505 could be configured toward the end of a conventional modification period (MP1) such as 502, and the length of the 'no fast switching period' 502 would be equal to two times the fast modification period (2*MP2). This configuration could be used under the circumstance in which a base station considers that the uplink and downlink traffic condition would not warrant a change in the TDD uplink-downlink subframe configuration toward the end of a conventional modification period or during the 'no fast modification period' 505. This configuration could also be used under the circumstance in which a base station considers that the interference condition has become intolerable and thus would decrease the number of fast modification periods available within a conventional modification period.

Figure 6:
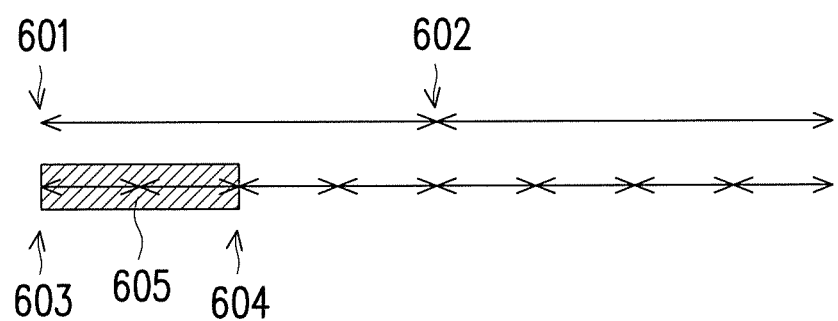
FIG. 6 illustrates impermissible fast modification period in the beginning of the conventional modification period in accordance with one of the exemplary embodiments of the present disclosure.

A 'no fast modification period' could also be configured in the beginning of a conventional modification period as illustrated in FIG. 6 in accordance with one of the exemplary embodiments of the present disclosure. In the exemplary scenario of FIG. 6, beginning from the boundary 601 which in this example is aligned with 603, two fast modification periods spanning from 603 to 604 would be configured as the 'no fast modification period' 605. A 'no fast switching period' such as 605 could configured at the beginning of a conventional modification period when a base station has determined that the current traffic pattern would require a no fast switching period to be configured in the beginning of a conventional modification boundary for reasons similar to the previous case.

Figure 7:
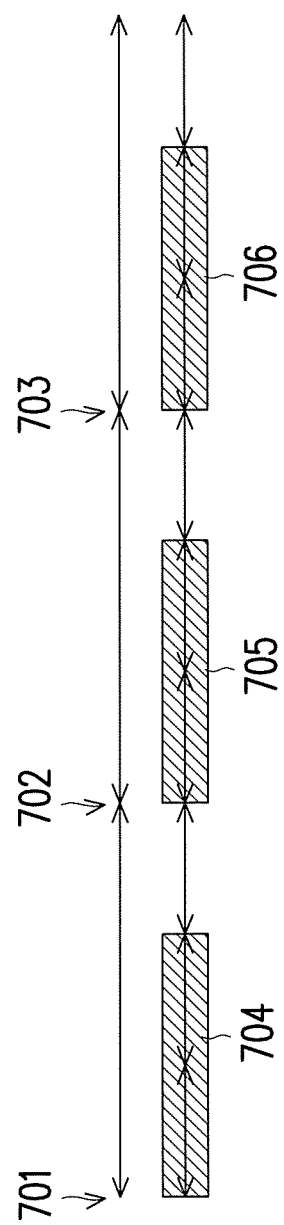
FIG. 7 illustrates a periodic configuration of impermissible fast modification period in accordance with one of the exemplary embodiments of the present disclosure.

In one of the exemplary embodiments which is similar to FIG. 6, 'no fast modification periods' could be configured to be in the beginning of a conventional modification boundary periodically. In the exemplary scenario of FIG. 7, in the beginning of each of the conventional modification periods such as 701, 702, and 703, 'no fast modification periods' 704, 705, 706 would be configured when a base station has determined from the traffic pattern that periodic 'no fast modification period' in beginnings of conventional modification periods would be required.

Figure 8:
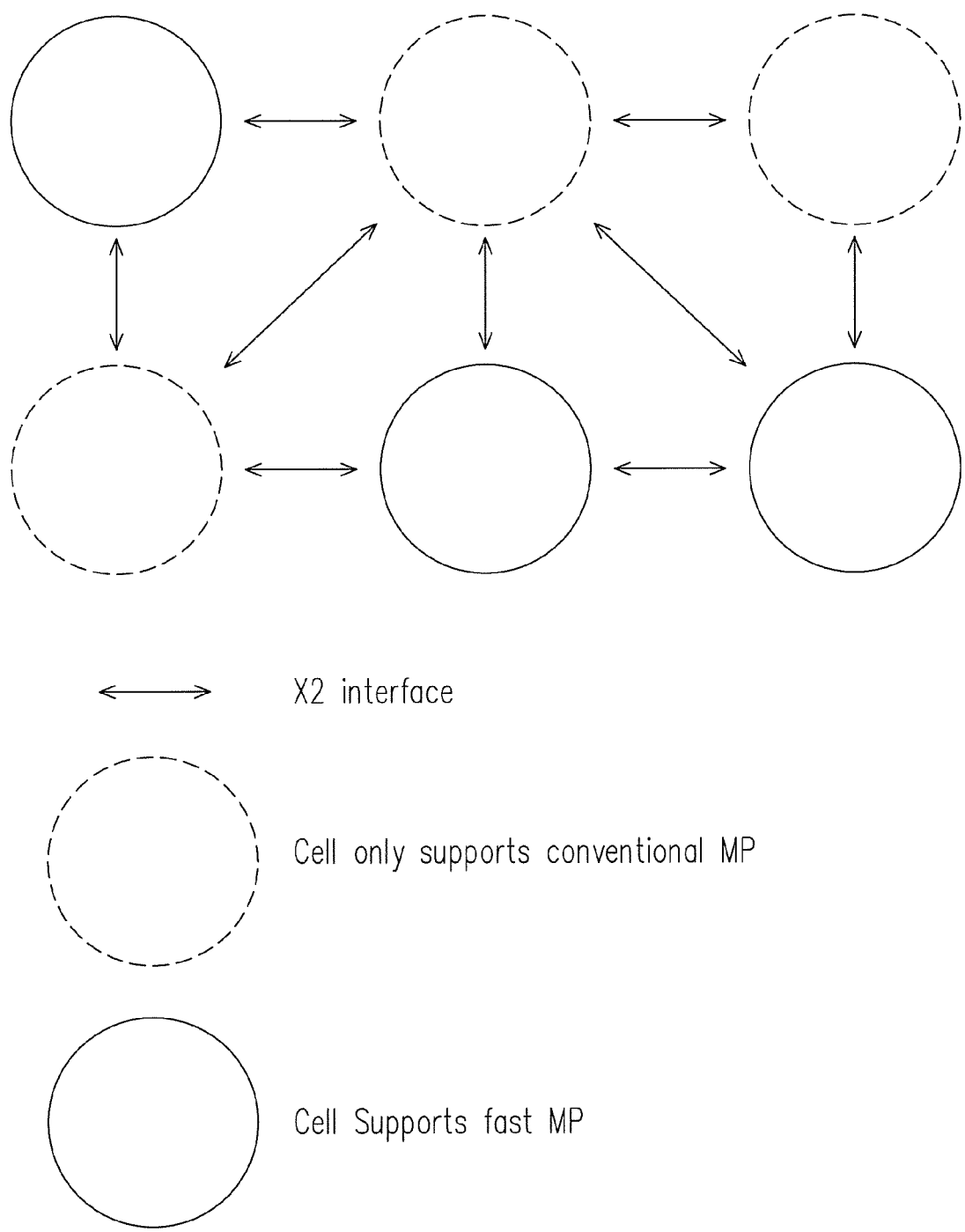
FIG. 8 illustrates a base station performing signaling exchanges with nearby base stations to exchange information related to the convention modification period and the fast switch period in accordance with one of the exemplary embodiments of the present disclosure.

The information related to the conventional and fast TDD adaptation mechanism including the time and duration of a 'no fast modification period' could be exchanged among base stations. The information related to the conventional and fast TDD adaptation mechanism may include at least one of the length of time of the conventional modification period (MP1), the length of time of the second modification period (MP2), the integer multiple N, the timing offset of the switching point which will be explained later, the time and duration of the 'no fast modification period'. FIG. 8 illustrates a base station within a cell performing signaling exchanges with base stations in nearby cells to exchange information related to the convention modification period and the fast modification period in accordance with one of the exemplary embodiments of the present disclosure. Base stations may exchange through an inter-base station interface such as a X2 interface the aforementioned information related to the conventional and fast TDD adaptation mechanism, and such information could be shared among base stations transmitted to a controller a radio access network (RAN) or to a control node in a core network (CN) for purposes including interference mitigation, interference measurement, signal quality measurement, channel state measurement, radio resource management such as resource allocation, power saving operations such as DRX in UEs, and base station power savings.

The aforementioned information related to the conventional and fast TDD adaptation mechanism may further include whether a cell would be classified as a switchable cell or a non-switchable cell. The base station serving a non-switchable cell may not support the fast TDD adaptation mechanism. It should be noted that the switchable or non-switchable status does not need to be static but could vary in different time periods. The switchable status might be further classified as uplink-plus switchable which means that a base station may adapt a TDD uplink-downlink subframe configuration with more uplink subframes) or a downlink-plus-switchable which means that a base may adapt a TDD uplink-downlink subframe configuration with more downlink subframes).

Figure 9:
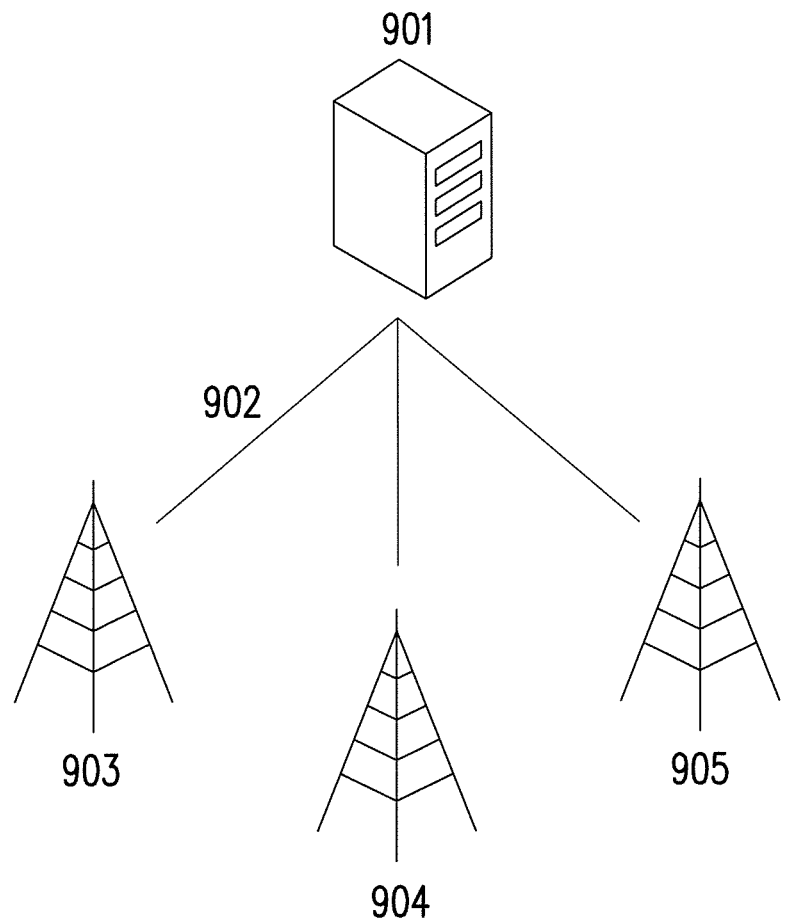
FIG. 9 illustrates a control node transmitting information related to the convention modification period and the fast switch period to a network control node in accordance with one of the exemplary embodiments of the present disclosure.

The aforementioned information related to the conventional and fast TDD adaptation mechanism may also be transmitted to a RAN control node or a CN control node as illustrated in FIG. 9 in accordance with one of the exemplary embodiments of the present disclosure. FIG. 9 shows base stations such as 903, 904, 905 transmitting signaling exchanges with a control node such as 901 through a backhaul link such as a S1 interface. The control node 901 could be an eNB or a controller in the RAN such as a radio network controller (RNC). The control node 901 would also be one of a core network control node such as a self organizing network (SON) server, a mobility management entity (MME), a Serving Gateway (S-GW), a Packet Data Network Gateway (PDN-GW), a Serving GPRS Support Node (SGSN), a Gateway GPRS Support Node (GGSN), a Mobile Switching Center (MSC), and a Home Subscriber Server (HSS) or a node maintaining a database related to subscriber information.

In order for a base station to accommodate both legacy UEs and UEs capable of fast TDD adaptation mechanism ("new UEs" hereinafter), at least two signaling methods would be used as one would be used by legacy UEs and another used by new UEs. Legacy UEs would be configured through legacy means. For new UEs which are in RRC connected mode or is actively attached to a serving base station, the UE may receiving signaling containing information related to the fast TDD adaptation mechanism through at least one of these following four signaling means including a physical layer signaling message, a MAC layer signaling message, a MBMS signaling message, a RRC signaling message. Any of these means would have lower signaling latency and lower adaptation delay (and would be referred to as fast signaling mechanism hereinafter); however, the information related to the fast TDD adaptation mechanism may also be conveyed to new UEs in RRC active mode through broadcasting system information blocks. The information related to the fast TDD adaptation mechanism may also include the new TDD uplink-downlink frame configuration.

For new UEs which are in RRC idle mode or in a sleep mode, a base station may configure the new TDD uplink-downlink frame configuration by first paging the new UEs under its domain. In accordance with one of the exemplary embodiments, the paging message would contain an indicator which would indicate whether the system information has been changed. In response to being paged, the UEs would locate and read the SIB containing information related to the fast TDD adaptation mechanism and the new TDD uplink-downlink subframe configuration. The details would be disclosed later on. In accordance with one of the exemplary embodiments, the paging message may contain a first indicator indicating whether the current cell supports the fast TDD adaptation mechanism and a second indicator whether the previous TDD uplink-downlink subframe configuration has been changed. When the first indicator and the second indicator indicate that the fast TDD adaptation mechanism is supported and the previous TDD uplink-downlink subframe configuration has been changed, the base station may transmit information related to the fast TDD adaptation mechanism through any of the four signaling means as previously mentioned. In accordance with one of the exemplary embodiments, when the first indicator and the second indicator indicate that the fast TDD adaptation mechanism is supported and the previous TDD uplink-downlink subframe configuration has been changed, the UE would locate and read the SIB containing information related to the fast TDD adaptation mechanism and the new TDD uplink-downlink subframe configuration.

Figure 10:
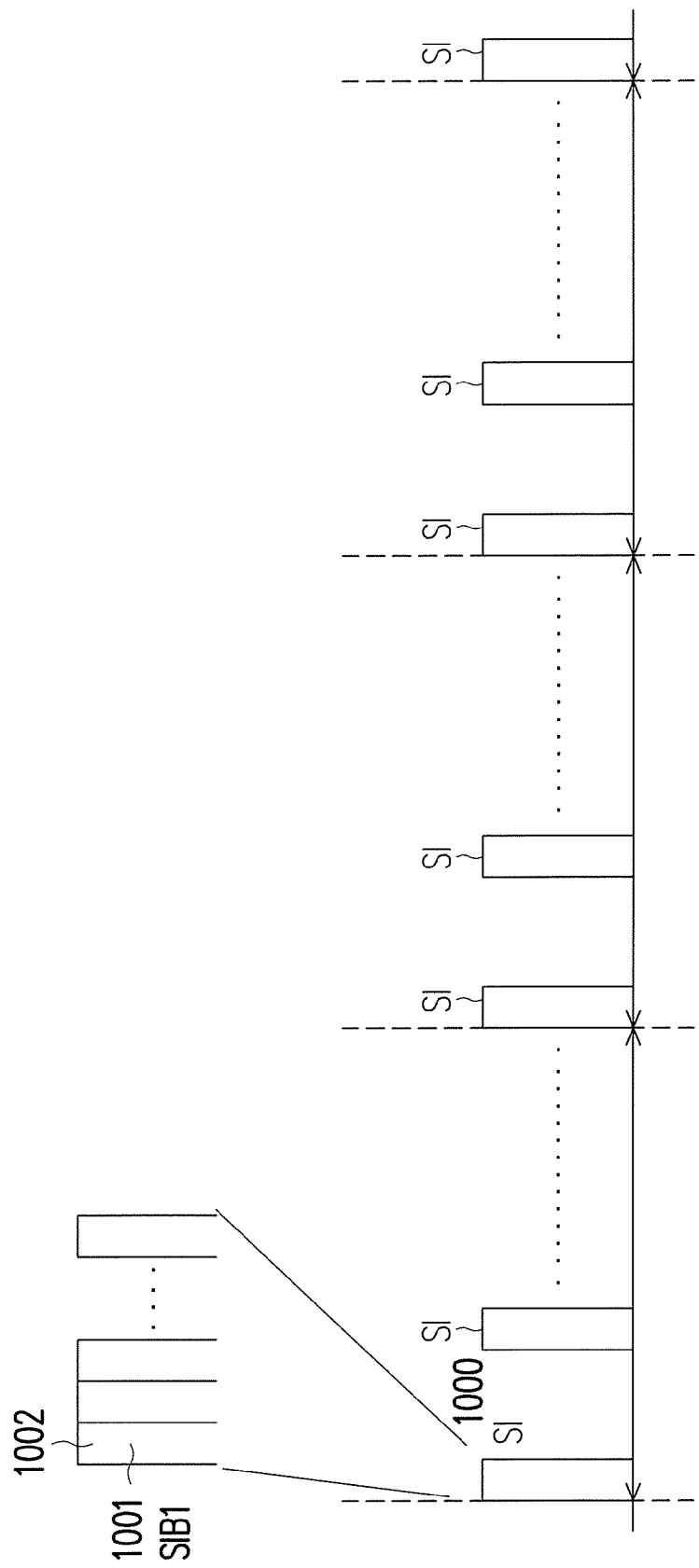
FIG. 10 illustrates periodically broadcasted system information block (SIB) to configure the fast modification period and/or the TDD uplink-downlink frame configuration in accordance with one of the exemplary embodiments of the present disclosure.

FIG. 10 illustrates periodically broadcasted system information block (SIB) to configure the fast modification period and/or the TDD uplink-downlink frame configuration in accordance with one of the exemplary embodiments of the present disclosure. The exemplary scenario of FIG. 10 shows system information being broadcasted periodically, and one of the system information 1000 would include SIB1 1001 through which a base station may convey to UEs the currently configured conventional modification period 1002 through SIB1 1001. For information related to the fast modification period, a base station may convey such information through any one of the SIBs. In one of the exemplary embodiments, indicators of the paging message could be automatically associated with a particular system information block which would convey a particular information. For example, upon receiving the abovementioned first indicator indicating the support for the dynamic TDD signaling mechanism, the UE would read a second SIB to obtain the information related to the fast TDD adaptation mechanism such as the fast modification period. Also for example, upon receiving the abovementioned second indicator indicating that the previous TDD uplink-downlink subframe configuration has been changed, the UE automatically associated the second indicator with a second SIB to obtain the new TDD uplink-downlink subframe configuration. The first SIB and the second SIB as mentioned here could be different or the same and could be any one of SIB14~17 or could be any new SIBs not currently used.

Figure 11:
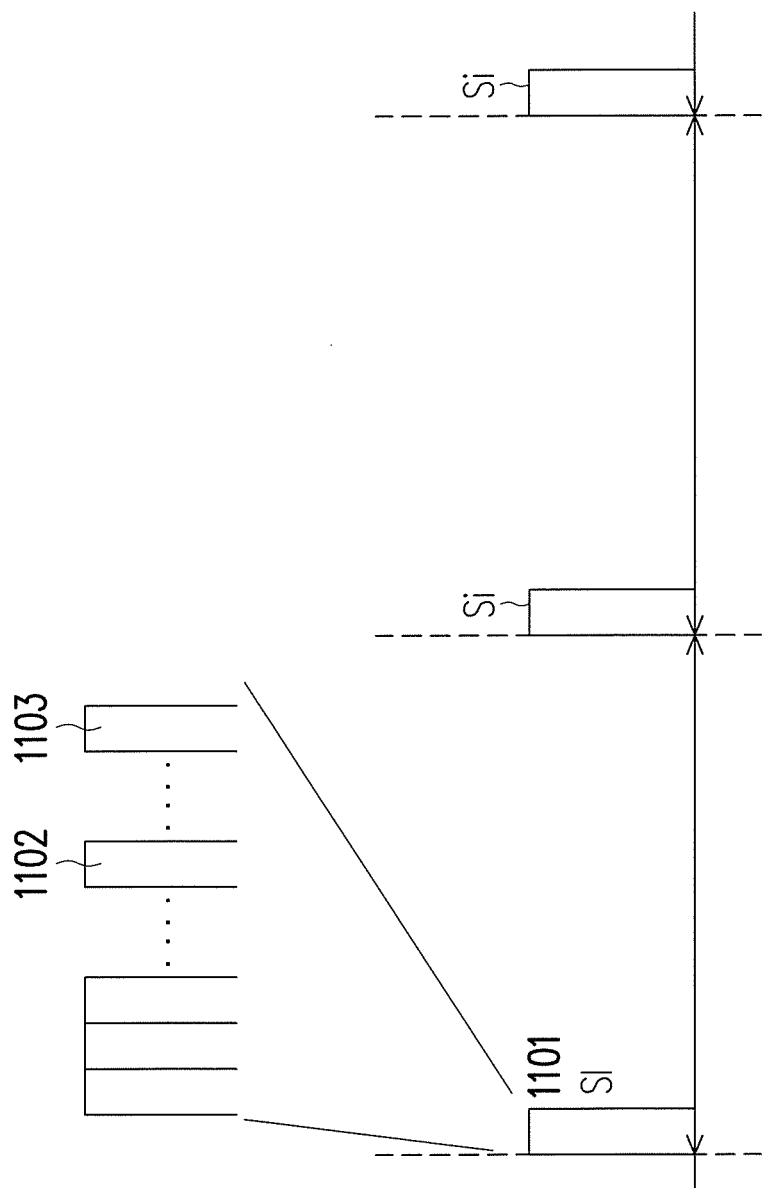
FIG. 11 illustrates using an indicator in SIB to indicate support for dynamic TDD mechanism in accordance with one of the exemplary embodiments of the present disclosure.

Besides using one or more indicator in a paging message, one or more indicator could be used in a SIB to indicate support for dynamic TDD mechanism as illustrated in FIG. 11 in accordance with one of the exemplary embodiments of the present disclosure. In the exemplary scenario of FIG. 11, a UEs may check a first SIB indicator 1102 embedded in one of the SIBs to discover whether the fast TDD adaptation mechanism is currently being supported. When the fast TDD adaptation mechanism is currently being supported, the UE may obtain the new TDD uplink-downlink subframe configuration in one of the SIBs 1103 which could be a new SIB.

Figure 12:
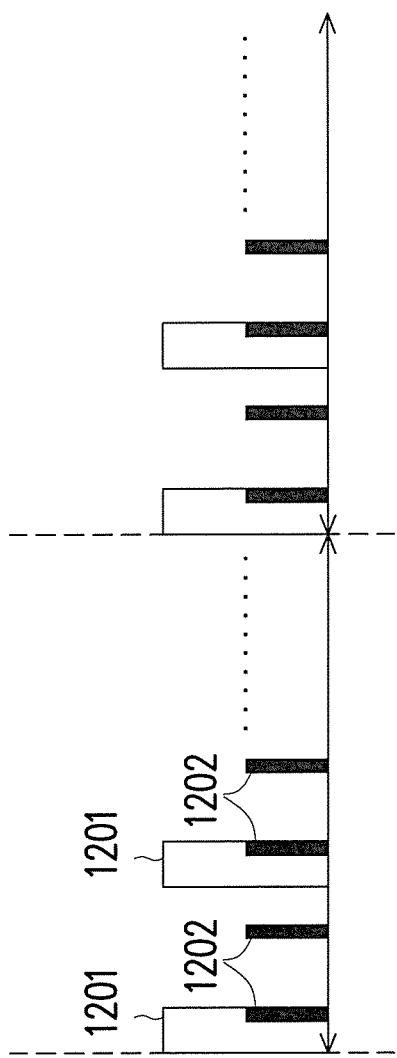
FIG. 12 illustrates the broadcasting periods of conventional SIBs and new TDD adaptation SIB in accordance with one of the exemplary embodiments of the present disclosure.

New SIBs could be broadcasted at a faster rate than the conventional SIBs. FIG. 12 illustrates the broadcasting periods of conventional SIBs and SIBs related to the new TDD adaptation in accordance with one of the exemplary embodiments of the present disclosure. In the exemplary scenario of FIG. 12, new SIBs such as 1202 are broadcast periodically at twice the rate as conventional SIBs 1201. In one of the exemplary embodiments, a new SIB would be broadcasted N times more than the conventional SIB1 within a modification period. In this way, a new SIB which is configured to carry the new TDD uplink-downlink subframe configuration could be modified N times more frequently than the conventional SIB1, and N would be an integer greater than one.

Figure 13:
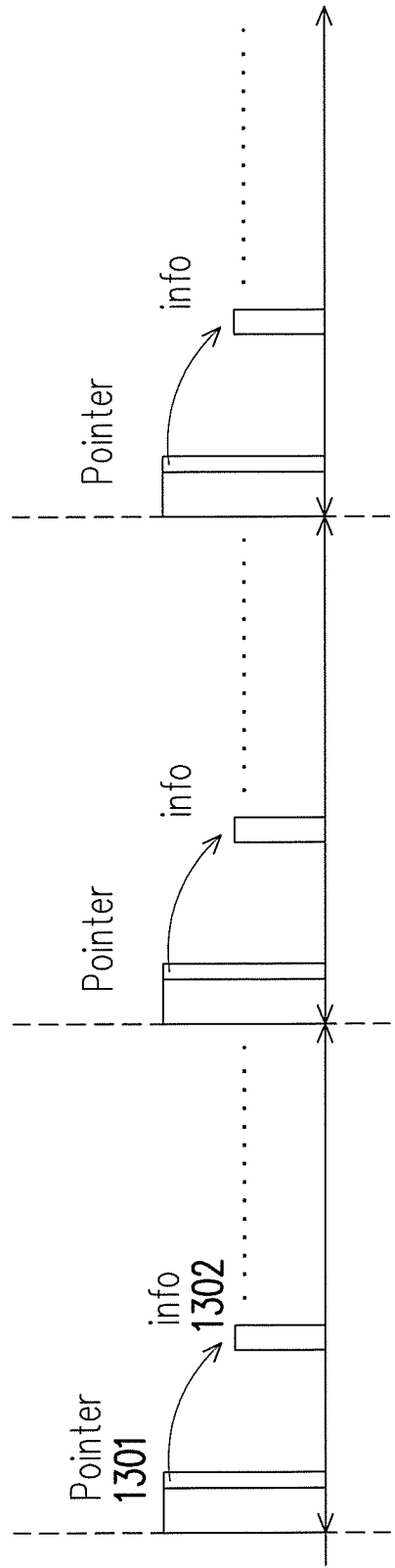
FIG. 13 illustrates periodic broadcasting SIB with pointers that point to information related to dynamic TDD configuration in accordance with one of the exemplary embodiments of the present disclosure.

Any one of the SIBs including new SIBs could contain a pointer which points to a resource containing information related to the fast TDD adaptation mechanism as FIG. 13 illustrates periodic broadcasting SIB with pointers that point to extra information in accordance with one of the exemplary embodiments of the present disclosure. As a UE reads a SIB 1301, the SIB may point to a different resource. The different resource in this example would be a new SIB 1302; however, the pointer may point to a resource which is entirely not related to SI. Also the new SIB 1302 may yet point to another SIB to uncover additional information. For example, after a UE is lead to reading the SIB 1301 containing the TDD uplink-downlink subframe configuration in the first place, the UE could then uncover a new SIB 1302 from reading the pointer contained SIB 1301, and the new SIB 1302 may contain additional information such as the time offset to enact the new TDD uplink-downlink subframe configuration, and then the new SIB 1302 may yet point to another location containing more information related to the TDD adaptation mechanism.

Figure 14:
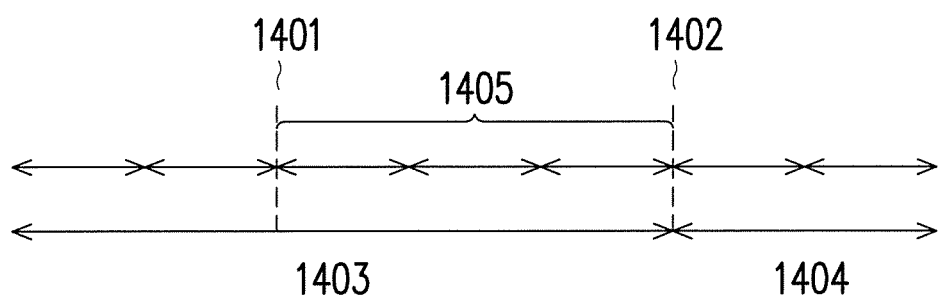
FIG. 14 illustrates transmitting a new uplink-downlink frame configuration and the new uplink-downlink frame configuration in actual effect in accordance with one of the exemplary embodiments of the present disclosure.

The above mentioned timing offset could be implemented according to the exemplary illustration of FIG. 14 which illustrates the effect of receiving a timing offset in conjunction with the new uplink-downlink frame configuration in accordance with one of the exemplary embodiments of the present disclosure. In the exemplary scenario of FIG. 14, a base station could transmit a command to alter the TDD uplink-downlink frame configuration at a modification boundary of 1401, but a timing offset indicating a delay of three modification periods could also be transmitted at the modification boundary of 1401. Thus, one TDD uplink-downlink frame configuration could be in effect during the time period 1403 until at the boundary of 1402 would another TDD uplink-downlink frame configuration be enacted. In the signaling message conveying the timing offset, the absolute switching time might be included so that a base station would enact the next TDD uplink-downlink frame configuration at the absolute switching time. Alternatively, in the signaling message, the timing difference 1405 could be used to indicate the timing offset. To switch the TDD configuration, signaling messages are sent from a base station to UE.

From the perspective of a UE, when the signaling message carrying the next TDD uplink-downlink subframe configuration is received, the UE may not immediately change to the new TDD frame configuration, but the UE would enact the new TDD frame configuration based on the timing offset. The timing offset could be delivered from a base station, or it could be a predetermined time in the future. The timing offset enacted by the UE would also be in the format of absolute time value such as a particular frame number and/or subframe number, or the effective time could be in the format of time difference relative to particular point of reference.

Figure 15:
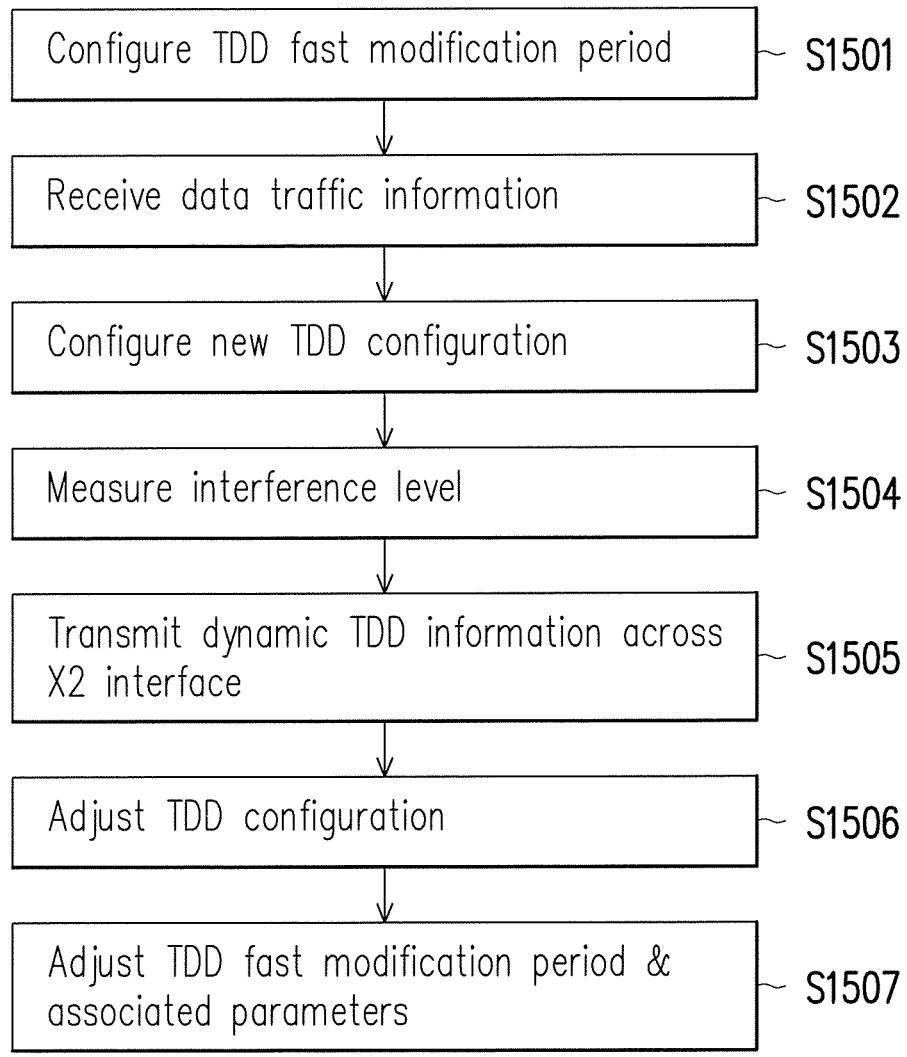
FIG. 15 is a flow chart which illustrates one example of applying the dynamic TDD signaling mechanism from the perspective of a base station in accordance with one of the exemplary embodiments of the present disclosure.

FIG. 15 is a flow chart which illustrates one example of applying the dynamic TDD signaling mechanism from the perspective of a base station. Please note that the disclosure related to the flow chart of FIG. 15 is merely exemplary as the present disclosure is not limited by its exact steps and sequence. In step 1501, a base station would configure a TDD fast modification period operating alongside the broadcasting system information having a conventional modification period. The fast modification period would be substantially an integer divisor of the fast modification period with the integer being greater than one. If necessary, the modification boundary of the integer divisor of the modification period could be configured to at least substantially align in the time domain with the modification boundary of the conventional broadcasting system information. In step S1502, the base station would receive data traffic information. The information of the data traffic could be based on information received from a network control node or could be based on the number of random access attempts by UEs or could be based on a historical data. In step S1503, the base station would configure a new TDD parameter including the TDD uplink-downlink subframe configuration in response to the data traffic information and transmit the new TDD parameters to UEs under its domain. In step S1504, the base station may measure the interference level in response to the change in TDD parameters. In step S1505, the base station may exchange dynamic TDD information across an inter-base station interface such as a X2 interface. In step S1506, the base station may adjust the TDD configuration based on factors such as the future data traffic level, the interference level experienced by the base station, and information received from other base stations. When the inter-cell interference level exceeds a certain interference threshold, the base station could adjustments such as by changing TDD configuration to match neighboring cells or to implement 'no fast modification period' to a number of fast modification periods proportion to the interference level, to align the switch points of the conventional modification period with the fast modification period, or even to stop supporting dynamic TDD adaptation mechanism for a period of time.

It should be noted that in the event that the interference level is tolerable but the data traffic is persistently bursty, the base station may increase the frequency of the fast modification period. In other words, since the conventional modification period is N times the fast modification period as previously mentioned, N could be increased to cope with spikes in the data traffic. Otherwise, if the data traffic is less bursty, N could be reduced in order to avoid unnecessary signaling overhead. Therefore, in step S1507, the base station may adjust the TDD fast modification period and parameters associated with it such as an enactment time offset.

Figure 16:
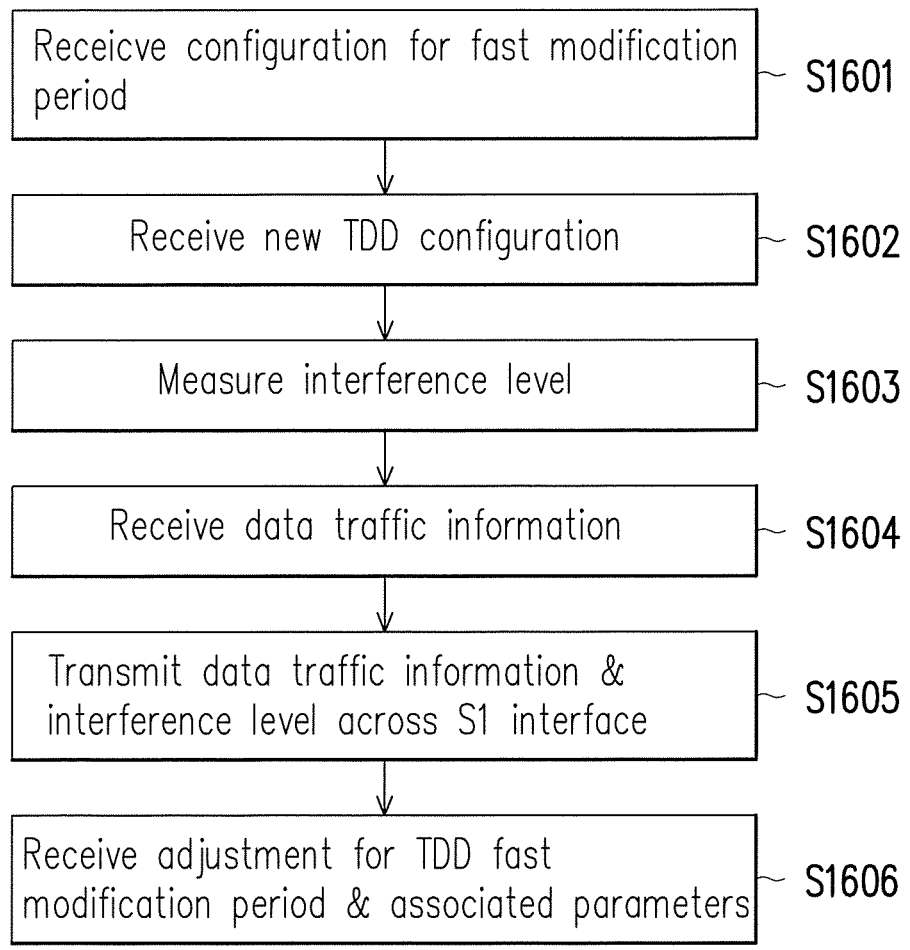
FIG. 16 is a flow chart which illustrates one example of applying the dynamic TDD signaling mechanism from the perspective of a base station in accordance with one of the exemplary embodiments of the present disclosure.

FIG. 16 is a flow chart which illustrates another example of applying the dynamic TDD signaling mechanism from the perspective of a base station. Please note that the disclosure related to the flow chart of FIG. 16 is merely exemplary as the present disclosure is not limited by its exact steps and sequence. In the example of FIG. 16, a network control node such as a MME would be in control of the TDD configuration. In step S1601, assuming that the RAN is a wireless LTE communication system, an eNB may receive configuration for a TDD fast modification period, and the operation of the fast modification period would be similar to the description for FIG. 3A & FIG. 15. In step S1602, the eNB would receive a new TDD configuration from a network control node from the core network, and the eNB would transmit the new TDD configuration to UEs under its domain in order to be enacted. In step S1603, the eNB would measure the resulting interference level in response to the change of the TDD configuration. In step S1604, the eNB would receive the current data traffic information. In step S1605 the eNB may transmit data traffic information & interference level across S1 interface to a network control node such as a MME. In step S1606, the eNB may receive a new TDD configuration from the network control node. In addition, if the network control node chooses to dynamically alter the TDD configuration, the eNB could receive adjustment for TDD modification period and associated parameters such as a time offset.

Figure 17:
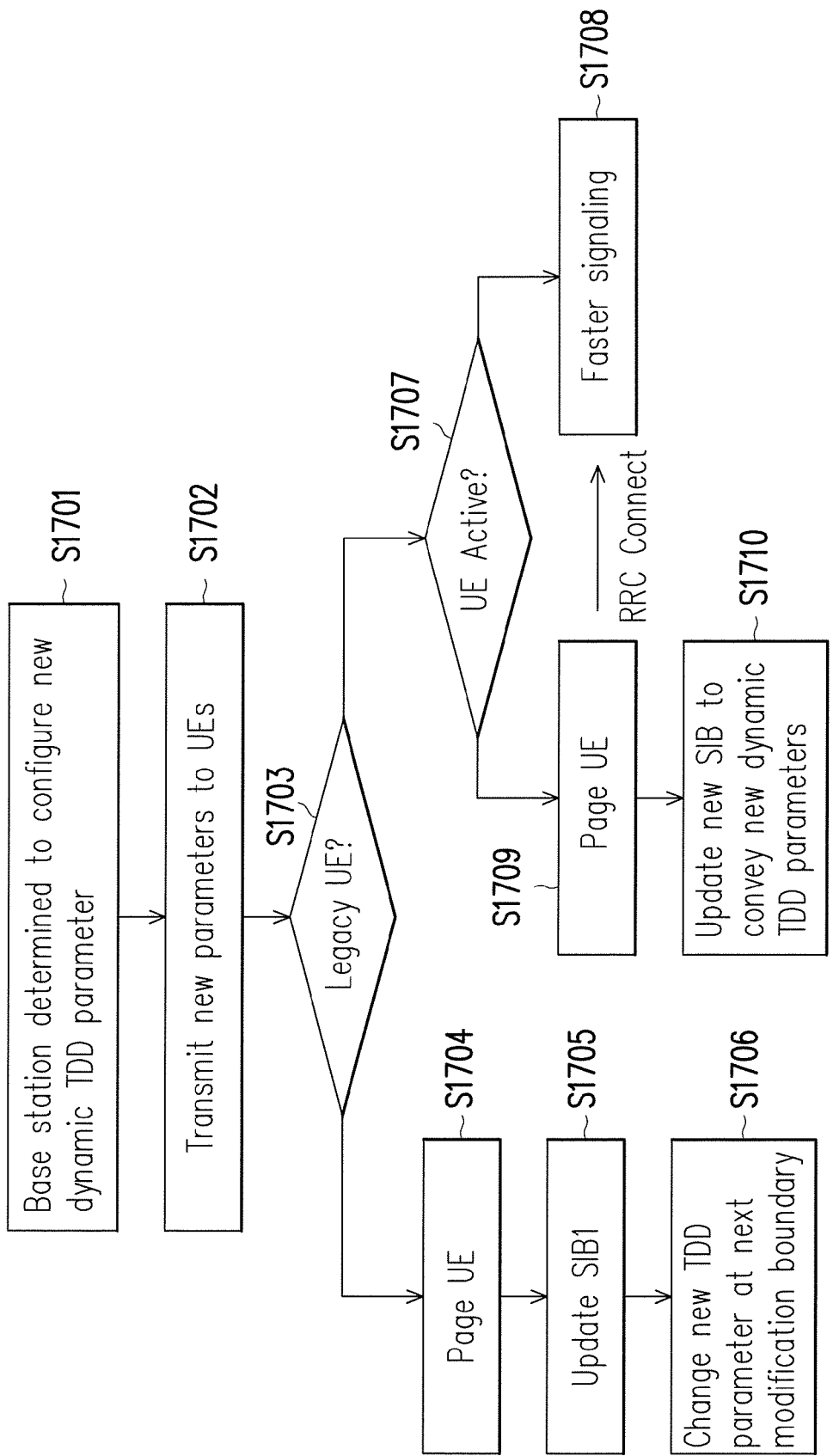
FIG. 17 is a flow chart which illustrates the dynamic TDD signaling mechanism in accordance with one of the exemplary embodiments of the present disclosure.

FIG. 17 is a flow chart which illustrates the dynamic TDD signaling mechanism in accordance with one of the exemplary embodiments of the present disclosure. In step S1701, a base station has determined to configure a new dynamic TDD parameter such as a new TDD uplink-downlink frame configuration, an associated timing offset, and etc. . . . In step S1702, the base station would transmit the new TDD parameter to UEs under its domain. In step S1703, the base station would use dual signaling mechanism with steps S1704~S1706, which are steps of conventional signaling system, targeted for legacy UEs that cannot understand dynamic TDD adaptation mechanism and steps S1707~S1710, which are steps of the dynamic TDD adaptation mechanism, targeted for new UEs. In step S1704, as the system information containing the new TDD parameter has been changed, legacy UEs would receive a paging message informing the change of the SI. In step S1705, in response to reading the paging message, the UE would read the updated SIB1. In step S1706, the legacy UE would change to the new TDD parameter at the following modification period.

In step S1707, for new UEs, the signaling mechanism could be different based on whether the UEs are in RRC active mode. In step S1708, assuming that the new UEs under the domain of the base station are RRC connected to the base station, the UEs would not listen to the paging message while in active mode and would be signaled using the aforementioned fasting signaling mechanism with lower signaling latency and lower adaptation delay relative to reading SIBs. In step S1709, assuming that the new UEs under the domain of the base station are in RRC idle or sleep mode, the new UEs would receive the paging message. Upon receiving the paging message, the new UEs may either attempt to perform RRC connection to the serving base station in order to receive signaling through the fast signaling mechanism as in step S1708, or the new UEs could obtain the new TDD parameter through the broadcast SIBs as in step S1710. In one of the exemplary embodiment, under the circumstance when the RAN is heavily congested or when the new UEs would not able to perform random accesses through the base station, step S1710 would be performed; otherwise step S1708 would be performed.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

A base station in this disclosure may also include base stations such as an advanced base station (ABS), a base transceiver system (BTS), a node B, an evolved node B (eNB), a home eNB, a macro base station, a pico base station, a femto base station, an access point, a home base station, a relay station, a repeater, an intermediate node, an intermediary, and/or satellite-based communication base stations.

From the hardware perspective, a base station may include at least but not limited to a transmitter circuit, a receiver circuit, an analog-to-digital (A/D) converter, a digital-to-analog (D/A) converter, a processing circuit, one or more antenna units, and optionally a storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The processing circuit is configured to process digital signal and to perform functions, processes or procedures, or method steps of the proposed method in exemplary embodiments of the present disclosure. Also, the processing circuit may optionally be coupled to a memory circuit to store programming codes, device configurations, a codebook, buffered or permanent data, and etc. . . . The functions of the processing circuit may be implemented using programmable units such as a micro-processor, a micro-controller, a DSP chips, FPGA, etc. The functions of the processing circuit may also be implemented with separate electronic devices or ICs, and the processing circuit may also be implemented with either hardware or software.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

From the hardware perspective, a UE may includes at least but not limited to a transmitter circuit, a receiver circuit, an analog-to-digital (A/D) converter, a digital-to-analog (D/A) converter, a processing circuit, one ore more antenna units, and optionally a memory circuit. The memory circuit may store programming codes, device configurations, buffered or permanent data, codebooks, and etc. . . . The processing circuit may also be implemented with either hardware or software and would be considered to implement the functions, processes or procedures, and method steps of embodiments of the present disclosure. The function of each element of a UE is similar to a control node and therefore detailed descriptions for each element will not be repeated.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A dynamic time division duplexing (TDD) method, for use by a user equipment (UE), and the method comprises:
receiving a first TDD uplink-downlink frame configuration within a first boundary of a first modification period of a first system information block;
receiving a configuration for a plurality of second modification periods of the first system information block, wherein the second modification periods are consecutively configured, a first length of the first modification period is N times of a second length of each of the second modification periods, N is an integer greater than one, and the first modification period is timed aligned with an integer multiple of the second modification periods, and the first modification period and the second modification periods are both active;
receiving a second TDD uplink-downlink frame configuration within a second boundary of one of the second modification periods, wherein the one of the second modification periods is overlapped with the first modification period; and
transmitting or receiving data according to the first TDD uplink-downlink frame configuration and the second TDD uplink-downlink frame configuration only after the one of the second modification periods.

2. The method of claim 1, wherein the integer division of the first modification period is substantially time aligned with the second modification periods.

3. The method of claim 2, wherein the UE does not change the second TDD uplink-downlink frame configuration during at least one second modification period of the first modification period.

4. The method of claim 2, wherein the step of receiving the configuration for the plurality of the second modification periods comprises:
receiving the second system information block in a faster rate than the first system information block.

5. The method of claim 4, wherein the second system information block comprises a first indicator indicating the existence of the second TDD uplink-downlink configuration.

6. The method of claim 5, wherein the second system information block further comprises a second indicator indicating whether the second TDD uplink-downlink configuration has been changed.

7. The method of claim 4, wherein when the UE is inactive, the step of receiving the configuration for the plurality of the second modification periods comprises:
receiving a paging message;
receiving the second system information block according to the paging message; and
receiving the configuration for the plurality of the second modification periods from the second system information block.

8. The method of claim 1, wherein when the UE receives the second TDD uplink-downlink frame configuration, the UE transmits or receives data according the second TDD uplink-downlink frame configuration after a predetermined period.

9. The method of claim 1, wherein when the UE is active, the step of receiving the configuration for the plurality of the second modification periods comprises:
receiving the configuration for the plurality of the second modification periods through one of a physical layer signaling message, a media access control (MAC) layer signalling message, a multimedia broadcast multicast service (MBMS) message, and a radio resource control (RRC) signalling message.

10. The method of claim 1, wherein the UE comprises a transmitter and a receiver for transmitting and receiving wireless data respectively, and a processor electrically coupled to the transmitter and the receiver and is configured to execute the functions of claim 1.

11. A dynamic time division duplexing (TDD) method, for use by a control node, and the method comprises:
   transmitting a first system information block which has a first modification period;
   transmitting a first TDD uplink-downlink frame configuration at a first boundary of the first modification period;
   transmitting a second system information block which comprises a configuration for a plurality of second modification periods of the first system information block, wherein the second modification periods are consecutively configured, a first length of the first modification period is N times of a second length of each of the second modification periods, N is an integer greater than one, the first modification period is timed aligned with an integer multiple of the second modification periods, and the first modification period and the second modification periods are both active;
   transmitting a second TDD uplink-downlink frame configuration at a second boundary of one of the second modification periods, wherein the one of the second modification periods is overlapped with the first modification period; and
   transmitting or receiving according to the first TDD uplink-downlink frame configuration and transmitting or receiving according to the second TDD uplink-downlink frame configuration only after the one of the second modification periods.

12. The method of claim 11, wherein the integer division of the first modification period is substantially time aligned with the second modification periods.

13. The method of claim 12, wherein the control node does not change the second TDD uplink-downlink frame configuration during at least one second modification period of the first modification period.

14. The method of claim 12, wherein the step of transmitting the configuration for the plurality of the second modification periods comprises:
   transmitting the second system information block in a faster rate than the first system information block.

15. The method of claim 14, wherein the second system information block comprises a first indicator indicating the existence of the second TDD uplink-downlink configuration.

16. The method of claim 15, wherein the second system information block further comprises a second indicator indicating whether the second TDD uplink-downlink configuration has been changed.

17. The method of claim 14, wherein the step of receiving the configuration for the plurality of the second modification periods comprises:
   transmitting a paging message;
   transmitting the second system information block indicated by the paging message; and
   transmitting the configuration for the plurality of the second modification periods using the second system information block.

18. The method of claim 11, wherein when the control node transmits the second TDD uplink-downlink frame configuration, the control node transmits or receives data according the second TDD uplink-downlink frame configuration after a predetermined period.

19. The method of claim 11, wherein the step of transmitting the configuration for the plurality of the second modification periods comprises:
   transmitting the configuration for the enhanced modification period through one of a physical layer signaling message, a media access control (MAC) layer signalling message, a multimedia broadcast multicast service (MBMS) message, and a radio resource control (RRC) signalling message.

20. The method of claim 11, wherein the control node comprises a transmitter and a receiver for transmitting and receiving wireless data respectively, and a processor electrically coupled to the transmitter and the receiver and is configured to execute the functions of claim 11.

21. The method of claim 11, wherein the control node is one of a base station (BS), an evolved node B (eNB), a node B, a small cell BS, a Self Organizing Network (SON) server, a mobility management entity (MME), a network controller, a core network gateway, and a radio network controller.

22. The method of claim 11, wherein information elated to the second modification periods is transmitted across an inter-base station interface such as a X2 interface or is transmitted across a back-haul link such as S1 interface.

* * * * *